July 12, 1938.  W. H. O'CONNOR  2,123,312
SKINNING MACHINE
Filed Nov. 13, 1935  2 Sheets-Sheet 1

Inventor
WILLIAM H. O'CONNOR
By Semmes & Semmes
Attorneys

July 12, 1938.  W. H. O'CONNOR  2,123,312
SKINNING MACHINE
Filed Nov. 13, 1935    2 Sheets-Sheet 2
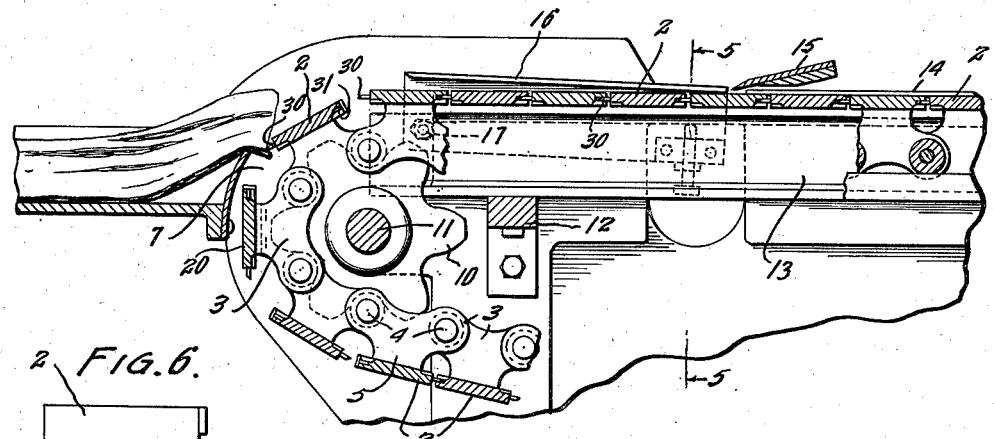
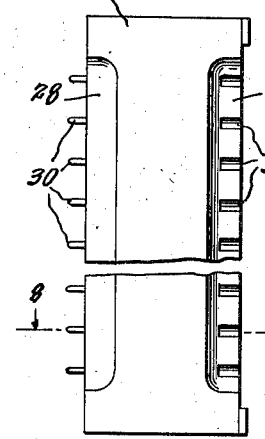
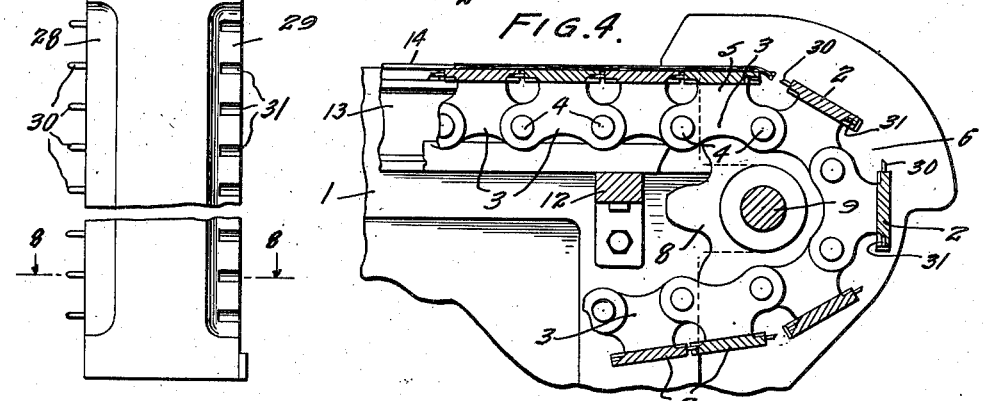
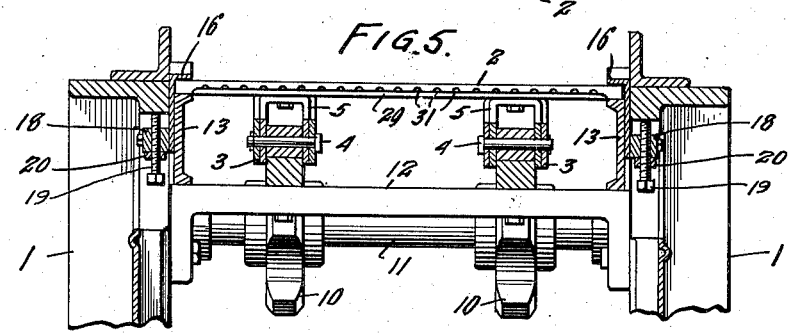
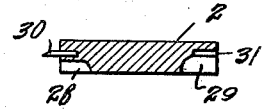
Inventor
WILLIAM H. O'CONNOR
By Semmes & Semmes
Attorneys Patented July 12, 1938

2,123,312

UNITED STATES PATENT OFFICE 2,123,312

SKINNING MACHINE

William H. O'Connor, Middletown, N. Y.

Application November 13, 1935, Serial No. 49,570

3 Claims. (Cl. 146—130)

My invention relates to skinning machines, and more particularly it relates to pork skinning machines.

It is desirable in pork skinning machines that fat and meat be removed from the skin with as much economy as possible—that is, the fat or meat adjacent the skin should be removed with as little fat remaining as possible.

Heretofore, machines have been devised which have left an undesirable amount of the fat or meat adjacent the points where the skins were grasped for passing them through the machine. Furthermore, during long continued use the means for grasping the skin of the pork have become worn and the operation was inefficient. Also, the removing of the skin from the machine at the discharge end was often an operation attended with considerable difficulty.

It is an object of this invention to permit the skin of the pork to be grasped and the skin and flesh passed through the machine leaving as little as possible of the fat on the skin.

Another object of the invention is to provide a machine which will grasp the skin over a long period of continuous use without necessitating replacement of parts that have become worn.

A further object of the invention is to provide a machine from which the skin may be easily discharged at the discharge end.

A still further object of the invention is to provide a machine which will permit some play between the parts at the initiation of the operation, thus relieving undue strains and permitting the desired flexibility at the receiving end of the conveyor.

With these and other objects in view which may be incident to my improvements, the invention consists in the parts and combinations to be hereinafter set forth and claimed, with the understanding that the several necessary elements comprising my invention may be varied in construction, proportions and arrangement, without departing from the spirit and scope of the appended claims.

In order to make my invention more clearly understood, I have shown in the accompanying drawings means for carrying the same into practical effect without limiting the improvements in their useful applications to the particular constructions which, for the purpose of explanation, have been made the subject of illustration.

In the drawings:

Figure 3 is a view taken along the line 3—3 of Figure 2 looking in the direction of the arrows.

Figure 4 is a view taken along the line 4—4 of Figure 2, looking in the direction of the arrows.

Figure 5 is a view taken along the line 5—5 of Figure 3, looking in the direction of the arrows.

Figure 6 is a detail bottom plan view of one of the holding plates adapted to be used with my machine.

Figure 7 is an end view of one of the holding plates used with my machine.

Figure 8 is a view taken along the line 8—8 of Figure 6, looking in the direction of the arrows.

Figure 1:
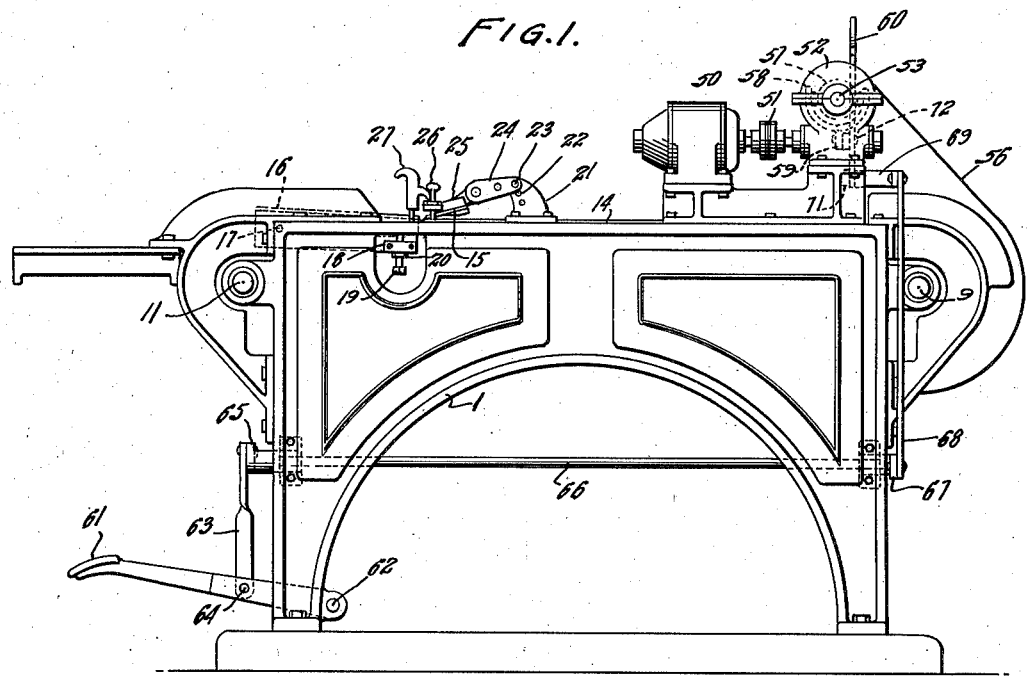
Figure 1 is a view in side elevation of my machine.
Figure 2:
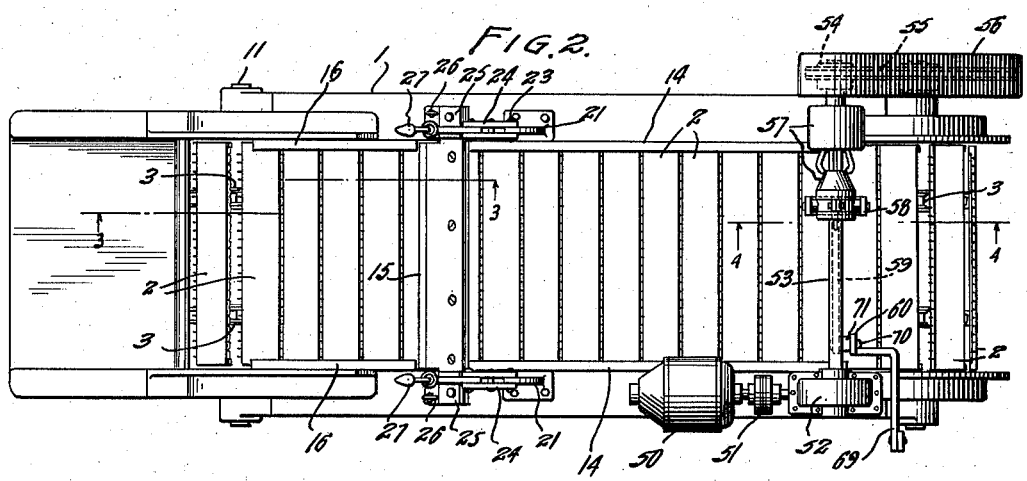
Figure 2 is a top plan view of my machine.

Referring to the drawings, I have shown a pork skinning machine which comprises a suitable supporting base 1 over which is adapted to travel a series of holding plates 2. The holding plates 2 are mounted on pivoted links 3 which are pivoted as indicated at 4 and which have mounting means 5 thereon upon which plates are mounted. The mounting means 5 are relatively long, so that when the holding plates 2 pass over the ends of the machine where sprocket wheels drive the pivoted links 3, the holding plates will be spaced far apart, as indicated at the point 6 in Figure 4 and the point 7 in Figure 3.

The pivoted links 3 are adapted to travel at the discharge end of the machine over sprocket wheels 8 mounted on a shaft 9. At the receiving end of the machine I have shown sprocket wheels 10 mounted on a shaft 11.

Mounted on brackets 12 within the frame 1 of the machine are lower curbs 13 which support the articulated holding plates throughout their travel. Upper curbs 14 bear against the top of the articulated holding plates 2 so that the plates are held to travel along the bed of the machine without much play in the up or down direction. At the throat of the machine, it is desirable, however, that there be allowed some buckling motion of the plates to facilitate ease in operation and prevent undue strain on the parts at this portion of the movement of the plates. Therefore, I have shown a throat of the machine in which such movement of the plates is permitted, the guiding means for the plates converging towards a skinning knife 15.

To permit of a throat construction of the type defined, I have shown upper curb sections 16 which are pivoted on the frame at pivots 17 at the entrance to the throat. It is to be noted that at the entrance to the throat, considerable play between the plates in the up and down direction is provided for. At the other end of the throat section, i. e. that adjacent the skinning knife 15, the upper curb section 16 is quite close to the lower curb 13, and small play in the up and down direction is permitted. I may, however, adjust the distance between the upper curb sections 16 and the lower curb 13, and have shown a construction in the drawings which permits this desirable adjustment to take care of matters such as wear, and operating conditions such as the type of material being treated, and other factors.

I have shown the upper curb sections 16 provided with projecting supports 18, through which are adapted to pass adjusting bolts 19 over which pass lock washers 20 to hold the bolts in their adjusted position. The upper end of the bolts 19 rests against a portion of the frame 1, thereby fixing the maximum desired clearance between the upper curb sections 16 and the lower curb 13. It is to be noted that the upper curb sections 16 are pivoted at 17 and float on top of the plates 2.

The knife 15 is spring pressed against the top of the pork rind or skin and floats thereover. It is adjusted to a minimum distance above the plates, but can float higher under spring pressure. This mechanism is described fully in my issued Patent 1,852,187, patented April 5, 1932, and comprises no part of this invention. Briefly, the construction comprises support brackets 21 having pivot holes 22 therein which are adapted to receive pivots 23 which hold holding plates 24. The holding plates 24 are at either side of the machine adapted to hold the knife 15, which is mounted on supports 25 that are adjusted by means of an adjusting screw 26 to a minimum distance above the plates. The members 27 hold the knife downwardly in a spring pressed relationship on top of the pork rind. A more full description of this mechanism can be found in my patent above referred to.

The plates each comprise a flat upper surface and a lower surface which is provided with hollowed-out recesses 28 at one side on the bottom thereof and hollowed-out recesses 29 on the other side at the bottom. Each plate is provided with pins 30 on one side and pin indentations 31 on the other side which are adapted to receive the pins of the adjacent plate. It is to be noted that in the direction of travel of the pork, as is shown in Figure 3, from left to right, the pins 30 point backwards. The recesses 28 and 29 give flexibility in operation and prevent binding of the parts. The rearward direction given to the pins 30 not only facilitates the release of the skins at the discharge end, but also at the feeding end of the machine the operator may enter the skin at a point where the gap between the plates is not very wide, and thus slip the end of the skin under the pins without enclosing much fat. This effects a distinct saving in the finished product. The nearer the end the skin is grasped, the greater the efficiency.

The indentations 31, in combination with the pins 30 of the adjacent plate, firmly hold the skins, even though the links wear and there is a change in the pitch of the chain. In some of the old type constructions, where the link pins wore, skins did often pull out. The present construction, with longer pins and in which pins enter partly into and under the opposing plate, gives a good gripping effect even when the parts have become worn and even without really puncturing the skins.

The throat construction of the machine which I have described is of great advantage, for the adjustable upper curb sections may be made to give the required tension in the region of the knife without causing undue friction before such region is reached through the rest of the initial slide. This throat construction, in a machine of this type where the skin is pinched between the plates, permits flexibility and ease of operation which is highly desirable.

The machine is adapted to be driven only when desired, and to this end I have provided a motor and clutch mechanism, the clutch being controlled by a foot pedal at the throat entrance of the machine or by a hand lever at the discharge end of the machine. Thus the operator can stop the machine at any particular point to insert the rind or skin into the holding means and control the speed of movement of the parts during this delicate operation. The hand lever at the discharge end enables an operator if desired to control the machine also from the discharge end.

In order to effect the control, I have shown an operating motor 50 which, through a coupling 51, is adapted to drive reduction gears indicated generally at 52, which rotate a shaft 53. The shaft 53 is provided with a sprocket 54 which, through a chain 55, drives a sprocket on the shaft 9. This sprocket and chain mechanism is shown in a casing 56. The sprocket on the shaft 9 is considerably larger than the sprocket 54 on the shaft 53 and this effects a further reduction in speed in turning of the shaft 9.

The clutching and declutching of power to the machine is effected by a clutch mechanism which I have indicated generally by the numeral 57, which mechanism comprises the usual clutch operating finger 58 controlled by a control rod 59 which is adapted to be reciprocated by means of a hand lever 60 at the discharge end of the machine or by a foot lever 61 at the receiving end of the machine.

The linkage from the foot lever is as follows. The foot lever 51 is pivoted at 62 and carries a link 63 which is pivoted on the foot lever itself at 64. The link 63 is pivoted to a crank arm 65 which is adapted to rotate a shaft 66 upon operation of the foot lever 61. The shaft 66 carries a crank 67 at its other end to which is pivoted a link 68. The link 68 is pivoted to a lever 69 at 70 on a support 71. The lever 69 is a bell crank lever and is pivotally attached at 72 to member 59, so that when lever 69 is rotated about its fixed pivot point 70, it will clutch or declutch the motor 50 to the sprocket 54 to stop or start the machine. As before stated, there is provided a hand lever 60 which is an extension of the bell crank lever 69 that will enable an operator at the discharge end of the machine to clutch and declutch the machine to the motor 50.

While I have shown and described the preferred embodiment of my invention, I wish it to be understood that I do not confine myself to the precise details of construction herein set forth, by way of illustration, as it is apparent that many changes and variations may be made therein, by those skilled in the art, without departing from the spirit of the invention, or exceeding the scope of the appended claims.

I claim:

1. A holding plate assembly for a skinning machine comprising movable plates, means to move the plates, each plate having hollowed-out recesses on either side at the under portion adjacent the edge of the plate, and pins on each plate pointing backward to the direction of travel to grasp the skin between it and the adjacent plate, the pins of one plate being adapted to lie in the recesses under the adjacent plate in the holding position.

2. In a skinning machine, movable articulated plates between which skin is adapted to be held, means to move the plates, upper and lower guiding curbs for guiding plates at each side thereof, upper curb sections slanted away from the lower adjacent curbs at the throat of the machine, and a knife located across the plates and above them adjacent the point where the upper curb sections at the throat lie nearest the lower curbs.

3. In a skinning machine, movable articulated plates between which skin is adapted to be held, means to move the plates, upper and lower guiding curbs for guiding plates at each side thereof, adjustable upper curb sections slanted away from the lower adjacent curbs at the throat of the machine, and a knife located across the plates and above them adjacent the point where the upper curb sections at the throat lie nearest the lower curbs.

WILLIAM H. O'CONNOR.